UNITED STATES PATENT OFFICE.

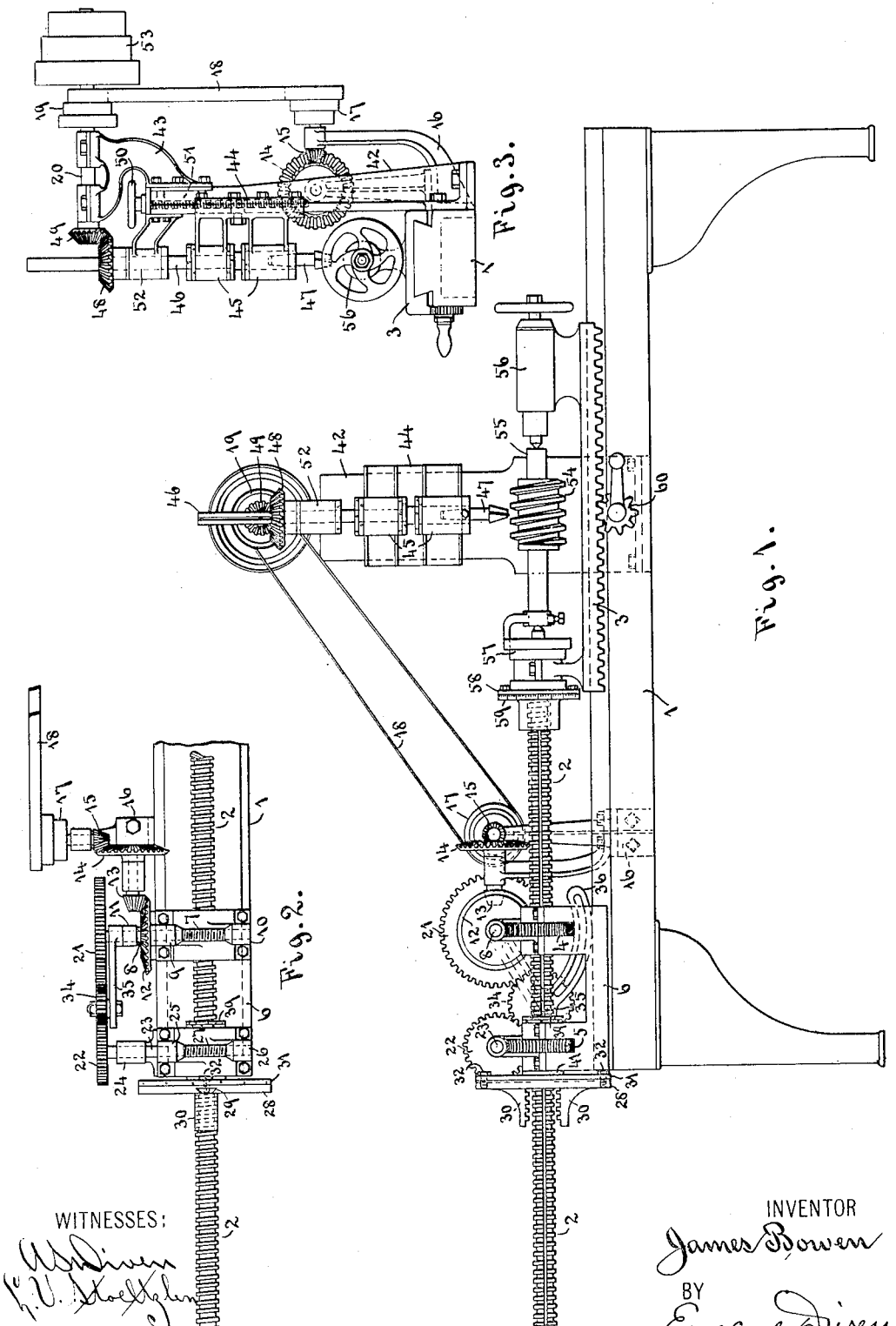

JAMES BOWEN, OF PHILADELPHIA, PENNSYLVANIA, ASSIGNOR TO SAYRE STAMPING COMPANY, OF SAYRE, PENNSYLVANIA.

MACHINE FOR CUTTING SCREWS, &c.

No. 882,290.  Specification of Letters Patent.  Patented March 17, 1908.

Application filed December 28, 1906. Serial No. 349,835.

*To all whom it may concern:*

Be it known that I, JAMES BOWEN, a citizen of the United States, residing at Philadelphia, in the county of Philadelphia and State of Pennsylvania, have invented certain new and useful Improvements in Machines for Cutting Screws, &c., of which the following is a specification.

This invention relates to improvements in machines wherein a milling cutter is employed for cutting screws, worms, and generally cylindrical surfaces of various shapes.

The principal object of my improvements is to provide a machine of this character which will accurately cut screws and worms of large diameters.

A further object is to provide a traveling carriage upon which the work is mounted, and to propel the carriage and rotate the work by means of a single lead screw; and, furthermore, to so arrange the lead screw that the work will be directly driven thereby, the driving mechanism for said lead screw being so constructed that the longitudinal movement of the lead screw may be regulated relatively to its rotary motion in conformity with any pitch of thread or width of cut which it may be desired to produce.

I attain my object by constructing the machine in the manner illustrated in the accompanying drawings, in which—

Figure 1 represents a front elevation of my complete machine; Fig. 2, a plan view of the left hand end thereof; and Fig. 3, an end elevation looking to the left in Fig. 1.

Like numerals designate like parts in the several views.

The machine comprises a bed 1 of suitable length supported on legs at the two ends and provided along its upper side with suitable guide-ways to receive the sliding parts of the machine. At a suitable distance above the bed, in a central longitudinal position, is the lead screw 2, the right hand end of which rotates in a bearing formed at one end of a carriage 3; the left hand end of the screw passing through hubs on worm wheels 4 and 5, which hubs are journaled in bearings formed on what may be termed the head-stock 6, which is rigidly fastened to the left hand end of the bed.

The driving and feed mechanism for the lead screw is the same as that which I have described more fully and claimed in a companion application Serial No. 349,834 filed of even date herewith and relating to improvements in machines for cutting screws, etc., of long lengths. To fully explain, however, the operation of the machine herein described, a description of this mechanism follows.

The worm wheel 4 is provided with a spline in its hub to engage a longitudinal groove on the lead screw, and it is rotated by means of the worm 7 mounted on the transverse shaft 8, which is journaled in the bearings 9 and 10 on the caps by which the worm wheel hub is held to its bearings in the head-stock 6. The outer end of shaft 8 is supported by a bracket 11 fastened to the back of the head-stock. The shaft is driven by means of the bevel gears 12 and 13, gear 13 being secured to the end of a short longitudinal shaft supported by one arm of the bracket 16 at the back of the machine. A bevel gear 14 at the other end of said shaft meshes with bevel gear 15 on a short transverse shaft supported by a second arm on bracket 16 set at right angles to the first. The gear 15 is driven by a cone pulley 17 from which the belt 18 runs to a cone 19 on the main drive shaft 20, which is supported on the bracket 43 at the top of the standard 42. Shaft 20, as herein shown, is provided with a large cone pulley 53, which will be driven from a cone on a suitably positioned counter shaft; but the shaft may be otherwise driven from a source of power. It will thus be seen that, when the main drive shaft 20 is set in motion, rotary motion will be transmitted to the lead screw by way of belt 18, gears 15, 14, 13, and 12, shaft 8 and the worm 7 which drives the worm wheel 4. This method of transmitting motion to the worm shaft 8 has been adopted as best meeting the requirements of this particular form of the machine. Other arrangements of the transmitting gear may be employed, however, without departing from the spirit of my invention.

To advance the lead screw from left to right, in order to feed the blank to the cutter with the required longitudinal motion, relatively to its rotary motion, to produce the required pitch in the thread which is being cut, I provide a divided nut to engage the lead screw. This feed nut comprises the threaded jaws 30 slidably mounted in diametrically opposite dovetailed grooves 29 formed on the face of the disk 28, said disk being attached to the outer end of the hub which carries the worm wheel 5. This hub is journaled in bearings formed at the left hand end of the head-stock 6, the end thrust on said hub in either direction being taken up by the shoulder 41 on one side and the lock nuts 39 upon the other. The worm wheel 5 meshes with the worm 27 mounted in the bearings 25 and 26 formed on the caps of the hub-bearings on the head-stock, the worm shaft 23 projecting out to the rear and being supported by a bracket 24 fastened to the head-stock. The shaft 23 is provided at its outer end with the gear wheel 22 in alinement with the gear wheel 21 on the outer end of the shaft 8, and, in order to transmit motion from shaft 8 to shaft 23, I provide one or more intermediate gears which are mounted on a movable pin, or pins, carried on a slotted arm 35 which is pivotally mounted upon shaft 8. In Figs. 1 and 2 an intermediate gear 34 is shown in position to transmit motion from gear 21 to gear 22. The arm 35 is held in proper adjustment by means of the slotted arc 36 which is locked in position on the bracket 11.

Any suitable adjusting means may be provided to place the nut jaws 30 in or out of engagement with the lead screw, one such means being described in my said co-pending application Serial No. 349,834, and which it is not necessary to further describe herein.

When the nut jaws are out of engagement with the lead screw and the machine is in motion, it will be evident that simply a rotary motion will be imparted to the lead screw from the worm shaft 8. If now the nut jaws be thrown into engagement with the lead screw, and no connection is established between the shafts 8 and 23, the nut will remain stationary and, as the lead screw is rotated, it will advance the blank to the cutting tool with a longitudinal travel which will produce on the blank a thread of the same pitch as that of the lead screw. If, however, it is desired to produce on the blank a thread having an increased pitch, gears 21 and 22 of the proper relative diameters will be placed on the shafts 8 and 23 and a suitable intermediate gear will be placed on the pin carried by arm 35 and brought into mesh with said gears, thereby transmitting motion from the shaft 8 to shaft 23 and causing the nut to rotate in a direction to hasten the longitudinal travel of the lead screw, thus increasing the pitch of the thread which is to be cut on the blank.

Should the machine be required to cut a thread of lesser pitch, then by placing a second intermediate gear on a pin secured in one of the slots on the arm 35, and meshing one intermediate gear with gear 21 and the other with gear 22, a reversed motion will be produced in the nut so that the travel of the lead screw will be retarded to an extent which will produce the required decrease in pitch. It will thus be seen that, by the use of properly proportioned change gears, the lead screw may be given a longitudinal travel at a greater or less speed relatively to its rotation, thereby producing any desired pitch in the thread to be cut on the blank.

With the exception of the means for driving the worm shaft 8 from the main driving shaft 20 of the machine, the mechanism as above described is the same as that which I have more fully described and claimed in my said co-pending application, the description being repeated here simply for the purpose of making clear the operation of the machine.

For cutting the threads for worms, or other screws, of large diameter I provide a standard 42 at one side of the bed, upon which is mounted a vertical slide 44 carrying vertical journal bearings 45, in which rotates a vertical tool spindle 46 carrying at its lower end a milling cutter 47; which cutter is removably attached to the drive spindle, in order that cutters of various sizes and shapes may be inserted according to the work required to be done. Spindle 46 is driven by a bevel gear 48 mounted in a bracket 52 projecting from the upper end of standard 42, said gear wheel being provided with a spline to engage a groove on the spindle, and being driven by bevel gear 49 attached to the forward end of shaft 20. The slide 44 is raised and lowered by means of a hand wheel 50 attached to the vertical screw 51, which engages a concealed nut on the slide, so that the cutter may be set according to the diameter of the blank and the depth of the cut to be produced thereon.

In Fig. 1 I have shown a finished worm 54 in position beneath the cutter 47. This worm blank, if it be hollow, will be mounted on a mandrel 55 held between live and dead centers, the live center being mounted in the arbor which is attached to the end of lead screw 2, and the dead center being mounted in the tail stock 56 which rises from the other end of the carriage 3. The blank is rotated by means of a dog attached to the mandrel and engaging the face plate 57, or a chuck may be substituted for the face-plate. Should the worm be solid, then the worm shaft will be secured in place between the live and dead centers in the same manner.

For quick adjustment, the carriage is moved back and forth upon the bed by means of the hand operated pinion 60, which engages a rack formed under the front projecting edge of the carriage.

In operation, when the machine is set in motion and the cutter 47 is lowered into position to make the necessary depth of cut, the rotary and longitudinal motion of the lead screw will cause the blank to revolve and, at the same time, move longitudinally past the cutter, thereby producing a thread upon the blank as predetermined by the adjustment of the machine, the longitudinal motion of the lead screw causing the carriage 3, which supports the end of the lead screw and also the blank, to travel along the bed of the machine. The proper relative speeds of rotation between the cutting tool and the blank are attained by the reducing gears 12, 13, 14 and 15, and by shifting the belt 18 on the cones 17 and 19.

In order that multiple threads may be cut upon the blank, I make the arbor for the face-plate 57 separate from the lead screw 2, said arbor being journaled in the bearing provided therefor at the left hand end of the carriage 3 and being coupled to the lead screw by means of the disks 58 and 59, the one attached to the arbor and the other to the end of the lead screw, said disks being coupled together by means whereby one disk may be turned and set relatively to the other. The periphery of one of these disks is provided with a suitable scale, an index mark being provided on the periphery of the other disk. In cutting, for instance, a double thread, after the first thread has been cut, the lead screw will be released from the nut 30 and the hand operated carriage 3 moved back to the left by means of the carriage adjusting pinion 60, to bring the blank in position to start the cutter 47 in on a fresh cut. The coupling between disks 58 and 59 is then loosened and the disk 58 given a half turn with relation to the disk 59, thereby rotating the blank a half turn and bringing it in position for the cutter to mill out a thread groove between the spirals of the groove already cut. The disks 58 and 59 will then be again rigidly coupled together, the nut jaws 30 thrown into engagement with the lead screw, and the machine again set in operation. In the same manner, by properly adjusting the disk 58 with relation to the disk 59, a still greater number of threads may be formed on the blank. This is a universal machine, being capable of cutting all pitches and styles of screw threads, whether right or left hand, as in the machine described in my said companion application. By disengaging the nut from the lead screw, it will be evident that the work in the carriage will be fed to the cutter by rotation only. Also by releasing the work from the face plate and fastening it against rotation in the carriage, it may be fed to the cutter with longitudinal motion only. A great variety of work may, therefore, be performed with this machine, and it may be variously modified to adapt it to work of different kinds without departing from the spirit of my invention.

The machine parts may also be variously modified within the scope of my invention. For instance, worms and worm wheels may be substituted for the gears 12, 13, 14 and 16 to more readily attain the required reduction in speed in the lead screw driving mechanism; and this reduction gear may be otherwise coupled to the main drive shaft than herein shown, or may be driven independently thereof.

What I claim as my invention and desire to secure by Letters Patent is—

1. The combination, in a machine of the character described, of a lead screw, a bed above which the lead screw is mounted, means at one end of the bed for transmitting rotary and longitudinal motions to the screw, a carriage mounted to slide upon the bed and having a bearing in which one end of the screw rotates, a tail stock on the carriage opposite the end of the screw, means for mounting a piece of work between the screw and tail stock, means for transmitting rotary motion from the screw to the work, a cutting tool, a driving spindle for the tool mounted on the machine at right angles to the axis of the blank, and means for rotating said spindle and for adjusting it to and from the blank.

2. The combination, in a machine of the character described, of a lead screw, a bed above which the lead screw is mounted, means at one end of the bed for transmitting rotary and longitudinal motions to the screw, a carriage mounted to slide upon the bed and having a bearing in which one end of the screw rotates, a tail stock on the carriage opposite the end of the screw, means for holding a piece of work in the carriage between the screw and tail stock, a standard at one side of the bed, a driving spindle adjustably mounted on the standard at right angles to the line of travel of the screw, means for attaching a cutting tool to the spindle to operate upon the work, a driving shaft geared to the spindle at the top of the standard, means for imparting motion to the driving shaft from a source of power, and means for transmitting motion from said shaft to the screw operating means.

3. The combination, in a machine of the character described, of a bed, a carriage mounted to slide upon the bed, means for mounting a piece of work at each end in the carriage, means for imparting longitudinal motion to the carriage, means for rotating the work in the carriage, and a cutting tool in position to operate upon the work.

4. The combination, in a machine of the character described, of a bed, a carriage mounted to slide upon the bed, means for mounting a piece of work at each end in the carriage, a lead screw having connection with the carriage, means for imparting rotary and longitudinal motions to the screw, and a cutting tool in position to operate upon the work.

5. The combination, in a machine of the character described, of a bed, a carriage mounted to slide upon the bed, means for mounting a piece of work at each end to rotate in the carriage, a lead screw, means for imparting simultaneous rotary and longitudinal motions to the screw, means for imparting the longitudinal motion from the screw to the carriage, means for imparting the rotary motion from the screw to the work in the carriage, and a cutting tool in position to operate upon the work.

In testimony whereof I have affixed my signature, in presence of two witnesses.

JAMES BOWEN.

Witnesses:
ROBERT J. BYRON,
EDMUND W. KIRBY.